(12) United States Patent
Lo (10) Patent No.: US 7,121,628 B2
(45) Date of Patent: Oct. 17, 2006

(54) BELT PRESSURE REDUCTION DEVICE

(76) Inventor: Chie-Fang Lo, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/989,005

(22) Filed: Nov. 15, 2004

(65) Prior Publication Data

US 2006/0108854 A1 May 25, 2006

(51) Int. Cl.
*B60R 21/18* (2006.01)
(52) U.S. Cl. ............................ 297/482; 280/733
(58) Field of Classification Search ............... 297/482; 280/733
See application file for complete search history.

(56) References Cited

U.S. PATENT DOCUMENTS

| | | | | |
|---|---|---|---|---|
| 3,706,462 A | * | 12/1972 | Lilly | 280/733 |
| 3,801,156 A | * | 4/1974 | Granig | 280/733 |
| 3,841,654 A | * | 10/1974 | Lewis | 280/733 |
| 3,848,887 A | * | 11/1974 | Fox | 280/733 |
| 3,865,398 A | * | 2/1975 | Woll | 280/733 |
| 3,866,940 A | * | 2/1975 | Lewis | 280/733 |
| 3,888,503 A | * | 6/1975 | Hamilton | 280/733 |
| 3,929,348 A | * | 12/1975 | Lawwill | 280/733 |
| 3,933,370 A | * | 1/1976 | Abe et al. | 280/733 |
| 3,970,329 A | * | 7/1976 | Lewis | 280/733 |
| 4,348,037 A | * | 9/1982 | Law et al. | 280/483 X |
| 4,971,354 A | * | 11/1990 | Kim | 280/733 |
| 5,062,662 A | * | 11/1991 | Cameron | 280/733 |
| 5,069,478 A | * | 12/1991 | Kim | 280/733 |
| 5,100,169 A | * | 3/1992 | Goor et al. | 280/733 |
| 5,162,006 A | * | 11/1992 | Yandle, II | 280/733 X |
| 5,184,844 A | * | 2/1993 | Goor | 280/733 |
| 5,242,193 A | * | 9/1993 | Humpal | 280/733 |
| 5,303,953 A | * | 4/1994 | Kamiyama et al. | 280/733 |
| 5,375,908 A | * | 12/1994 | Goor | 297/216.11 |
| 5,383,713 A | * | 1/1995 | Kamiyama et al. | 297/471 |
| 5,385,368 A | * | 1/1995 | Bridge | 280/733 |
| 5,393,091 A | * | 2/1995 | Tanaka et al. | 280/733 |
| 5,456,491 A | * | 10/1995 | Chen et al. | 280/733 |
| 5,465,999 A | * | 11/1995 | Tanaka et al. | 280/733 |
| 5,474,326 A | * | 12/1995 | Cho | 280/733 |
| 5,511,820 A | * | 4/1996 | Hatfield | 280/733 |
| 5,597,178 A | * | 1/1997 | Hardin, Jr. | 280/733 |
| 5,642,902 A | * | 7/1997 | France | 280/733 X |
| 5,765,869 A | * | 6/1998 | Huber | 280/733 X |
| 5,839,753 A | * | 11/1998 | Yaniv et al. | 280/733 |
| 5,863,065 A | * | 1/1999 | Boydston et al. | 280/733 |
| 5,871,230 A | * | 2/1999 | Lewis | 280/733 |
| 6,007,092 A | * | 12/1999 | Martz | 280/733 |
| 6,126,194 A | * | 10/2000 | Yaniv et al. | 280/733 |
| 6,142,511 A | * | 11/2000 | Lewis | 280/733 |
| 6,189,921 B1 | * | 2/2001 | Takeuchi | 280/733 |
| 6,213,508 B1 | * | 4/2001 | Cornell | 297/482 X |
| 6,237,945 B1 | * | 5/2001 | Aboud et al. | 280/733 |

(Continued)

*Primary Examiner*—Rodney B. White (57) ABSTRACT

A belt pressure reduction device comprises a combining portion being formed by folding two sides of a plane structure so that one side covers upon another side to form an adhering section so as to form a hollow receiving space within the combining portion for receiving an air cushion and a belt; one end of the air cushion being an airbag and another end thereof being an air inflation unit. The inflation unit serves to inflate air into the air cushion so as to cause the airbag to be elastic. The air cushion is not separated from the combining portion. The inflation unit of the air cushion exposes out of the combining portion. The combining portion is formed with at least one air hole. Two ends of the combining portion are foldable and unfoldable repeatedly.

5 Claims, 10 Drawing Sheets

U.S. PATENT DOCUMENTS

| | | | |
|---|---|---|---|
| 6,276,715 B1 * | 8/2001 | Takeuchi | 280/733 |
| 6,336,656 B1 * | 1/2002 | Romeo | 280/733 |
| 6,352,282 B1 * | 3/2002 | Hirose | 280/733 |
| 6,419,263 B1 * | 7/2002 | Busgen et al. | 280/733 |
| 6,585,289 B1 * | 7/2003 | Hammer et al. | 280/733 |
| 6,641,165 B1 * | 11/2003 | Ohhashi | 280/733 |
| 2005/0121967 A1 * | 6/2005 | Crowl | 297/482 |

* cited by examiner

BELT PRESSURE REDUCTION DEVICE

FIELD OF THE INVENTION

The present invention relates to belts, and in particular to a belt pressure reduction device, which can provide an elastic structure for a long time so as to reduce the pressure applied on the shoulders of the users.

BACKGROUND OF THE INVENTION

In the prior art, the belt applies a great pressure to the shoulders of a user. To improve this defect, a shoulder protection portion is formed on the belt so as to reduce the pressure on the shoulders. The protection portion is formed by fiber cloth or sponges. However the elastic coefficients of the fiber cloth and sponge are small. The protection portion will fatigue elastically or deform after being used for a longer time period or as the bag supported by the belt is heavy. Thereby the prior art is a not a preferred one, which can not improve the prior art defect completely.

SUMMARY OF THE INVENTION

Accordingly, the primary object of the present invention is to provide a belt pressure reduction device, which can provide an elastic structure for a long time so as to reduce the pressure applied on the shoulders of the users.

To achieve above objects, the present invention provides a belt pressure reduction device which comprises a combining portion being formed by folding two sides of a plane structure so that one side covers upon another side to form an adhering section so as to form a hollow receiving space within the combining portion for receiving an air cushion and a belt; one end of the air cushion being an airbag and another end thereof being an air inflation unit; wherein the inflation unit serves to inflate air into the air cushion so as to cause the airbag to be elastic. The air cushion is not separated from the combining portion. The inflation unit of the air cushion is exposed outside of the combining portion. The combining portion is formed with at least one air hole. Two ends of the combining portion are foldable and unfoldable repeatedly.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following details. However, these descriptions and the appended drawings are only used for those skilled in the art to understand the objects, features, and characteristics of the present invention, but not to be used to confine the scope and spirit of the present invention defined in the appended claims.

Figure 1:
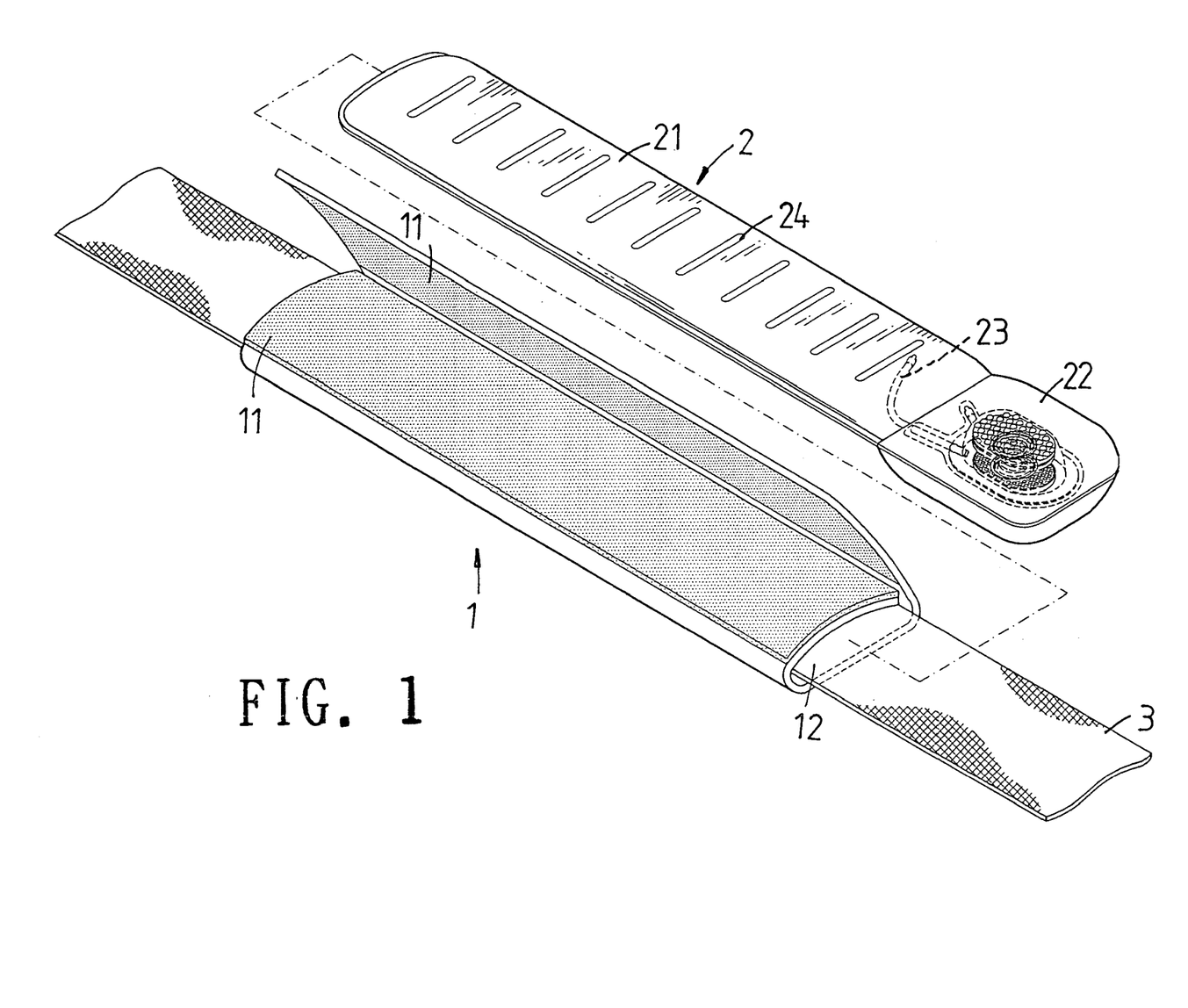
FIG. 1 is an exploded perspective view of the belt pressure reduction device of the present invention.
Figure 2:
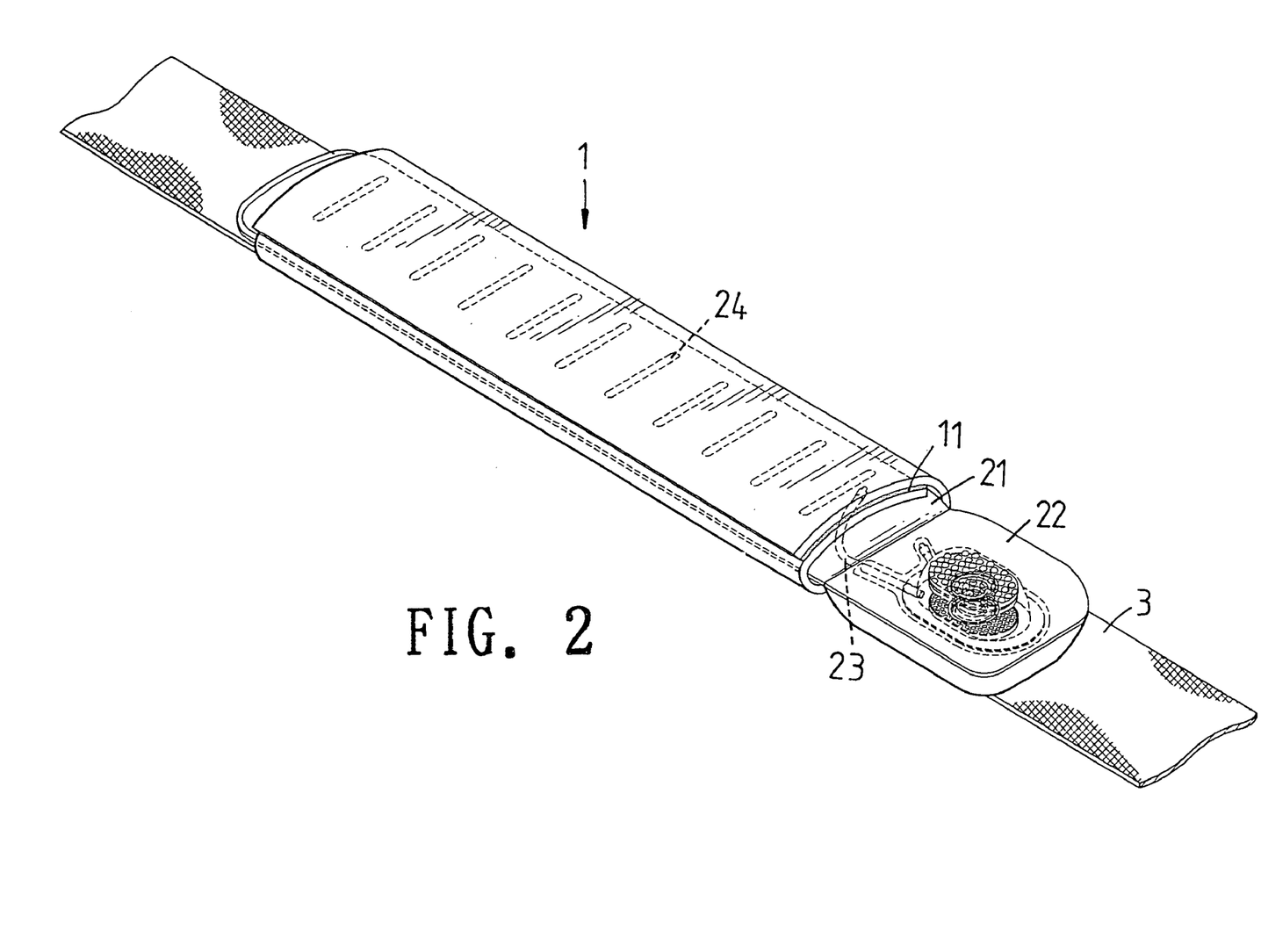
FIG. 2 is a perspective view of the belt pressure reduction device of the present invention.

With reference to FIGS. 1 and 2, the structure of the present invention is illustrated. The present invention has the following elements. A combining portion 1 is a long belt-like structure. The combining portion 1 is formed by folding two sides of a plane structure so that one side covers upon another side so as to form an adhering section 11, as illustrated in FIG. 2. As a result, a hollow receiving space 12 is formed within the combining portion 1 for receiving an air cushion 2 and a belt 3.

One end of the air cushion 2 is an airbag 21 and another end thereof is an air inflation unit 22. A surface of the airbag 21 is formed with a plurality of enhancing ribs 24 for enhancing the structure of the airbag 21 so as to prevent the airbag 21 from breaking due to a long period of use or a large pressure applied thereon. A guide tube 23 serves to communicate the airbag 21 and the air inflation unit 22.

When the inflation unit 22 is pressed, air will flow into the airbag 21 from the guide tube 23 so as to inflate the airbag 21 to have an air cushion 2. However the inflation unit 22 is used generally and thus the details thereof will not be described herein. Air in the airbag 21 will have an elastic buffer effect so as to disperse the pressure of the shoulders from the belt 3. Thereby the user will feel comfortable. The air cushion 2 can inflate air into the airbag 21 by the inflation unit 22 at any time. Thereby the elasticity of the airbag 21 will not change due to long period of use. Thereby the effect of the belt 3 of the present invention can be retained.

Figure 3:
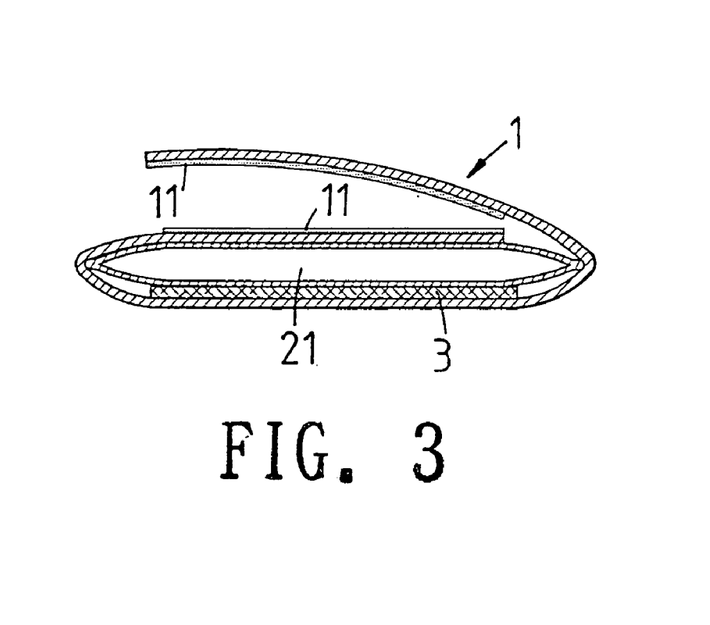
FIGS. 3 and 4 are cross sectional views about the use of the present invention.
Figure 4:
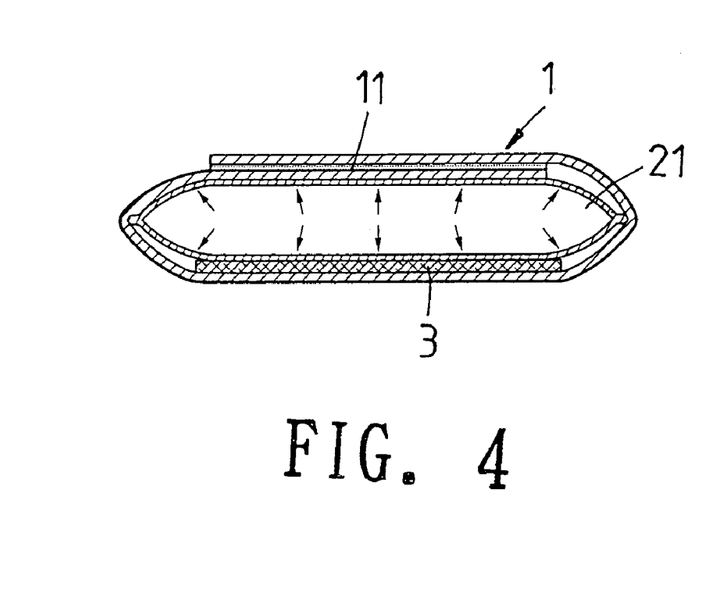

In application of the present invention, referring to FIG. 3 and 4, the combining portion 1, air cushion 2 and the belt 3 are combined. That is, the air cushion 2 and the belt 3 are placed into the receiving space 12 of the combining portion 1 so that the air cushion 2 is placed below the belt 3. Then the two sides of the combining portion I are folded so that one side covers upon another side to have an adhering section 11. Thereby the air cushion 2 and the belt 3 are fixed to the receiving space 12 of the combining portion 1. The pressure reducing structure of the present invention is achieved. After assembly, the inflation unit 22 of the air cushion 2 can be pressed so that the airbag 21 is inflated (referring to FIG. 4). When the airbag 21 of the air cushion 2 expands, it has a buffer effect so as to disperse pressure. Thereby the user will feel comfortable when using the belt 3 of the present invention to load a bag. Thus the ache of shoulders can be reduced.

Figure 5:
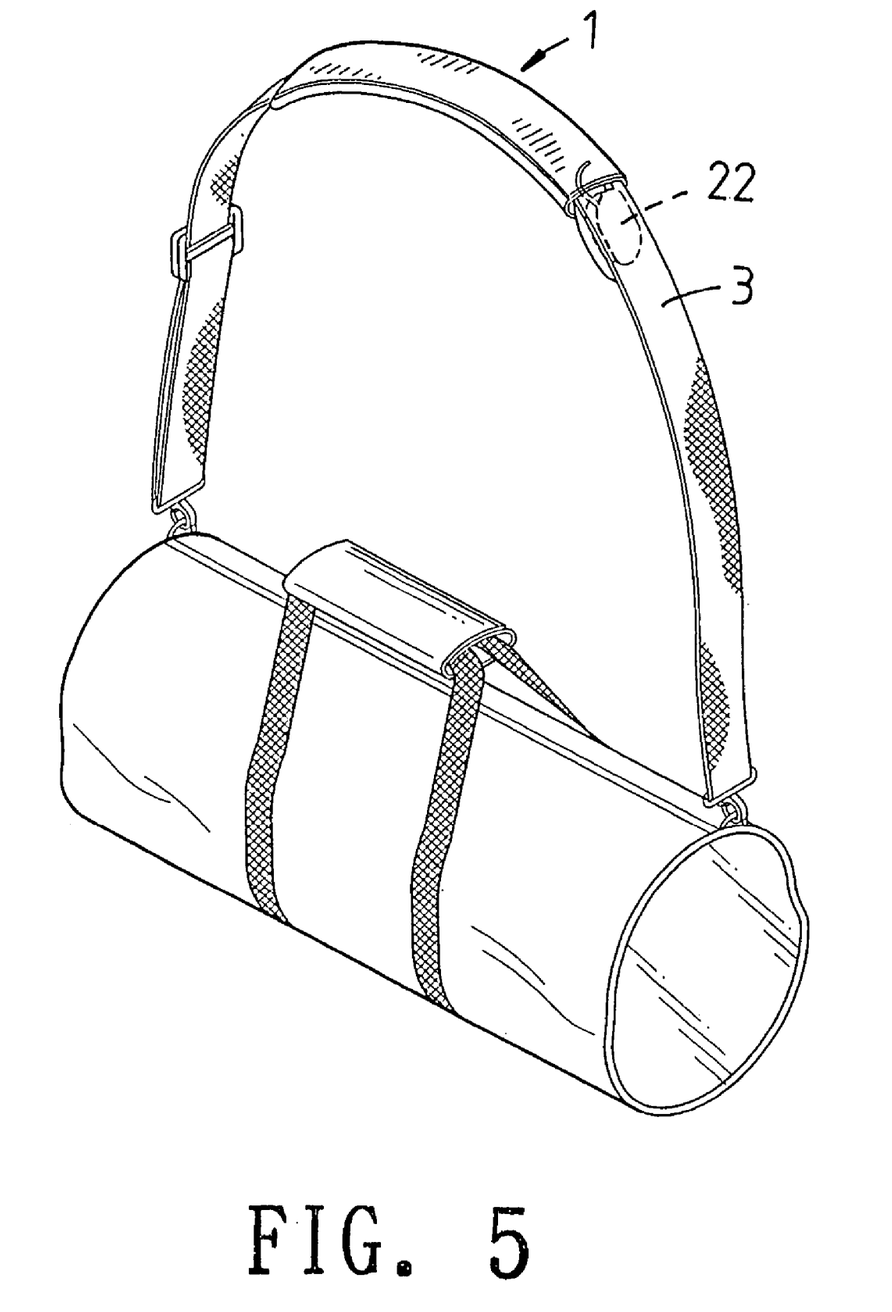
FIGS. 5, 6, and 7 are schematic views of the present invention.
Figure 6:
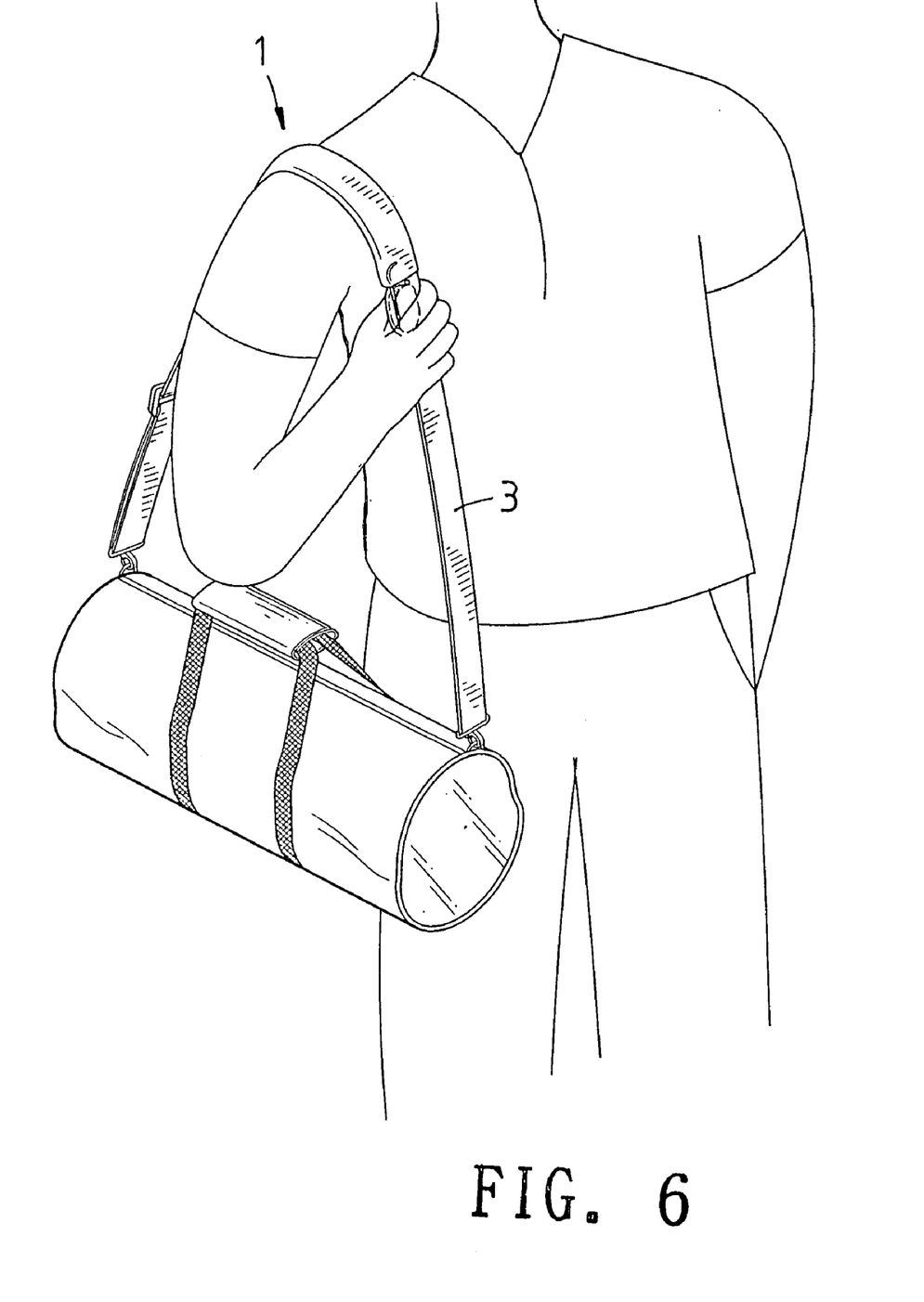
Figure 7:
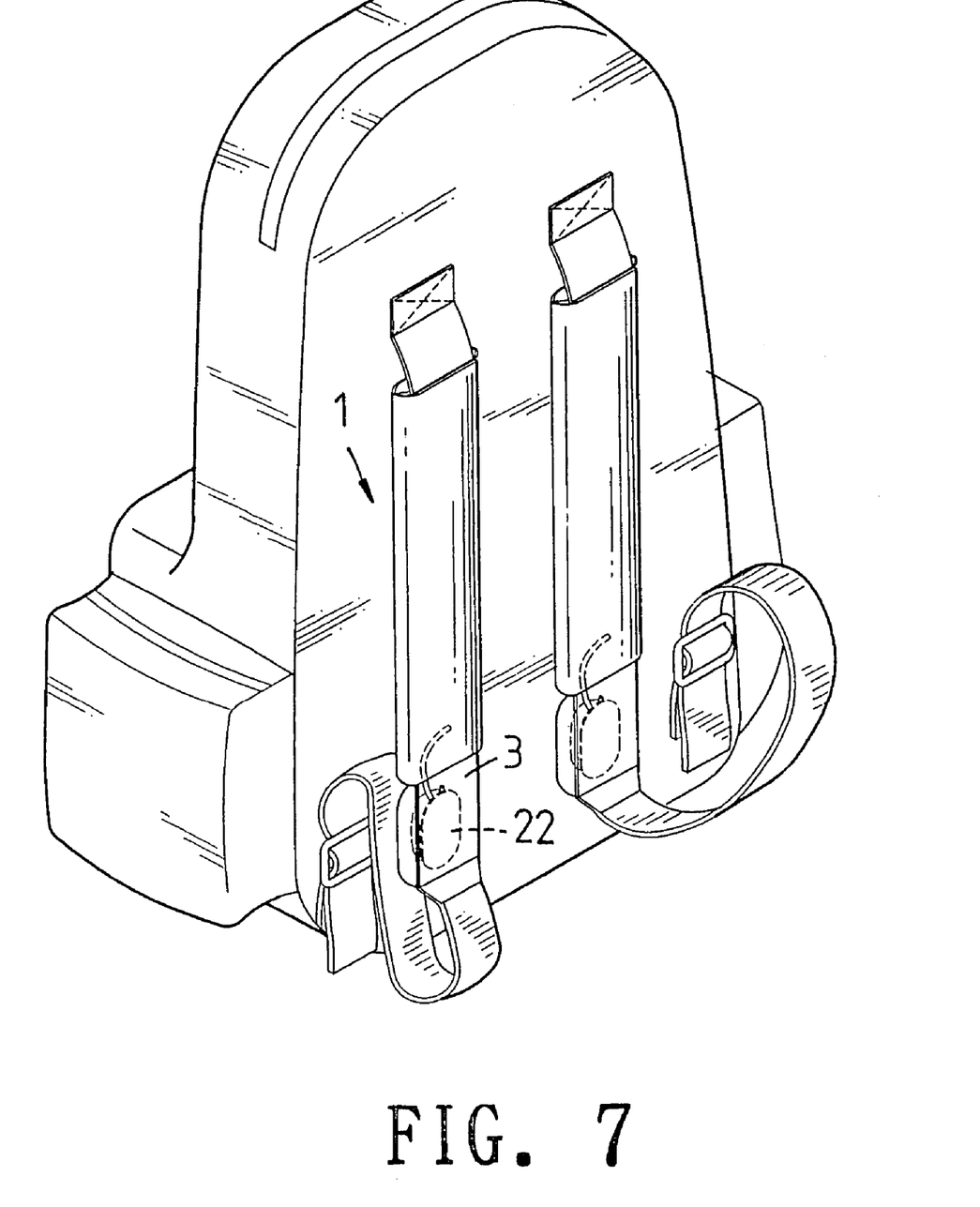

Referring to FIGS. 5 and 7, the adhering section 11 of the combining portion 1 of the present invention can be unfolded and folded repeatedly. Thereby it can be used in various different kinds of belts 3, for example it can be used in a bag having one belt 3 (referring to FIG. 5) or a bag having a plurality of belts (referring to FIG. 7).

Figure 8:
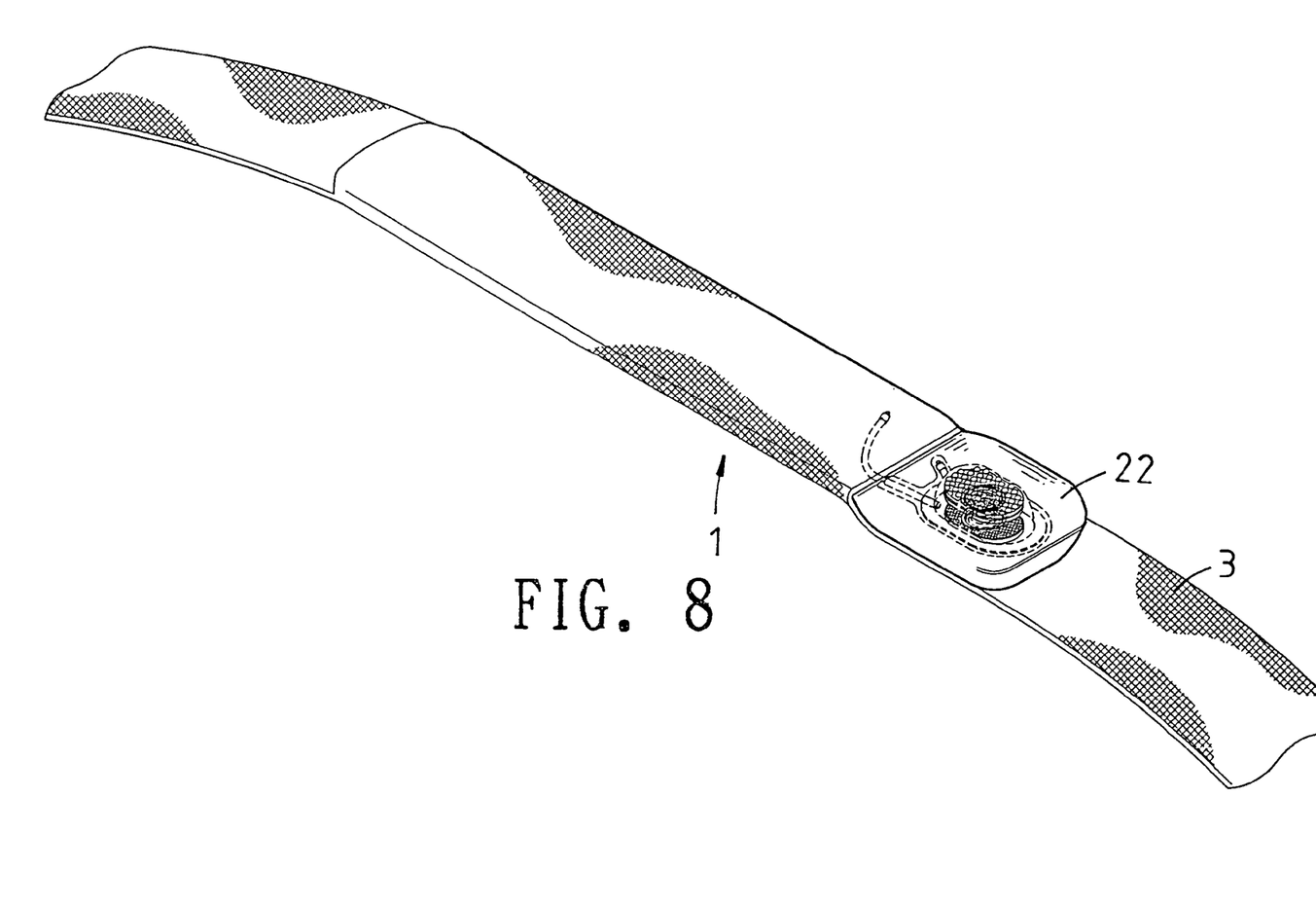
FIG. 8 is exploded perspective view of the second embodiment of the present invention.

Referring to FIG. 8, the second embodiment of the belt pressure reducing device of the present invention is illustrated. The main elements thereof identical to those described in the first embodiment will not be described herein. However in this embodiment, the combining portion 1 and the air cushion 2 are integrally formed and then they are fixed to the belt 3. Thereby when using of a bag, it is unnecessary to combine the combining portion 1 to the belt 3, the airbag 21 can be adjusted by using the inflation unit 22 of the air cushion 2 so as to reduce the pressure of the shoulders.

Figure 9:
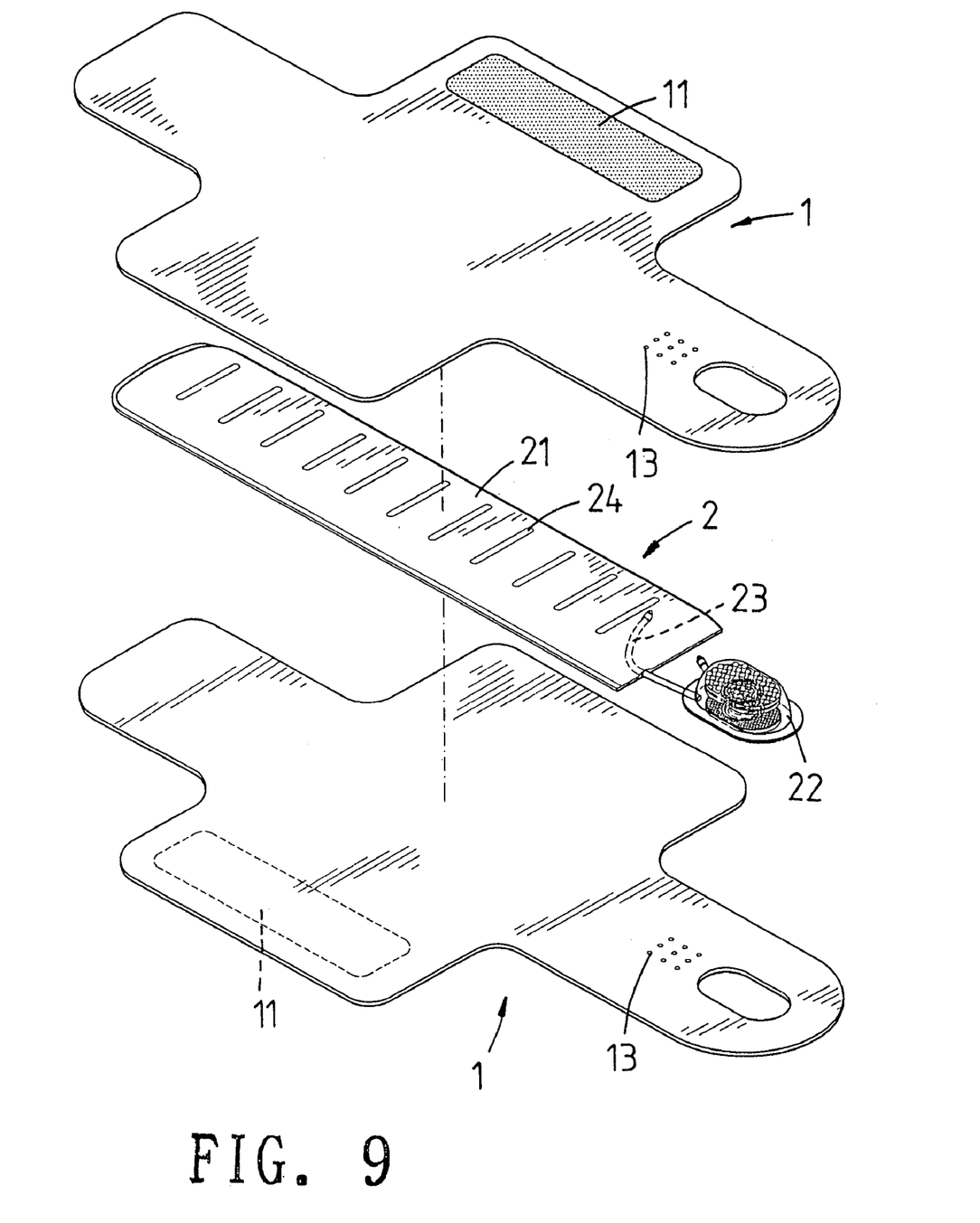
FIG. 9 is exploded perspective view of the third embodiment of the present invention.
Figure 10:
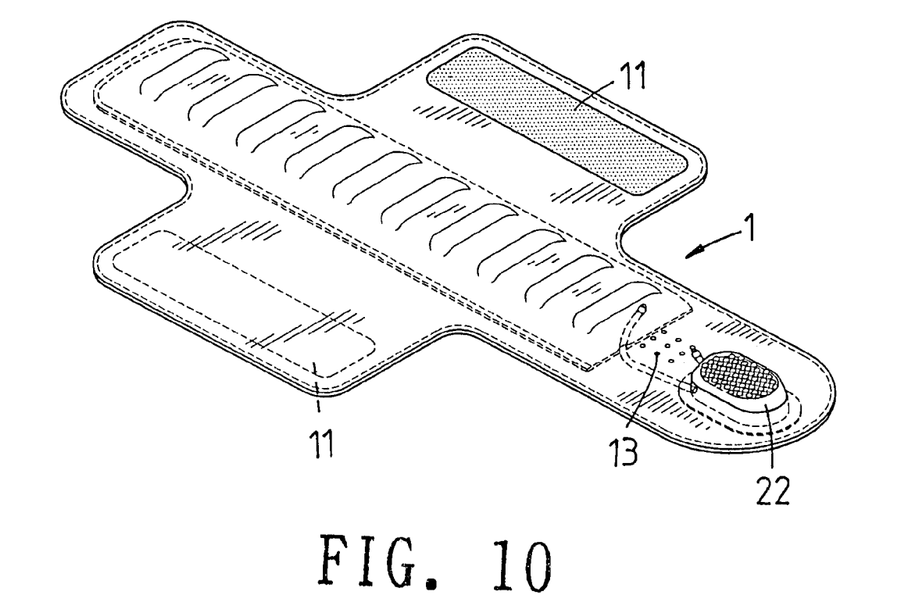
FIG. 10 is a perspective view of the third embodiment of the present invention.
Figure 11:
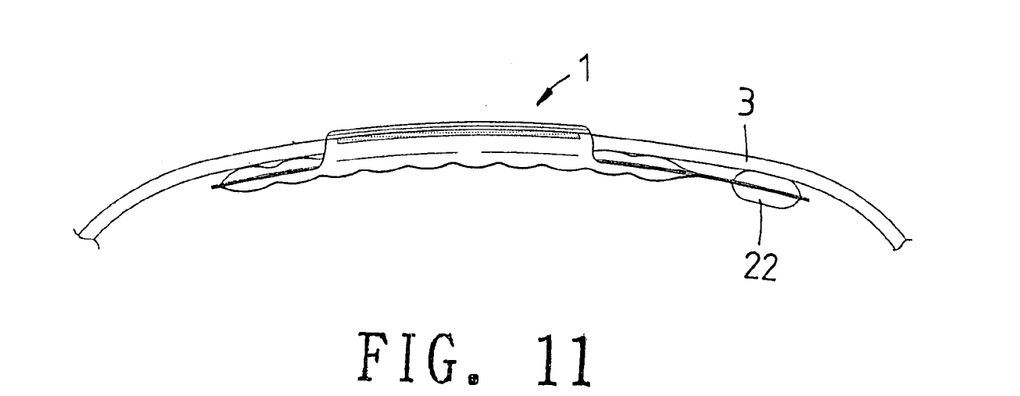
FIG. 11 is a lateral view showing the use of the third embodiment of the present invention.
Figure 12:
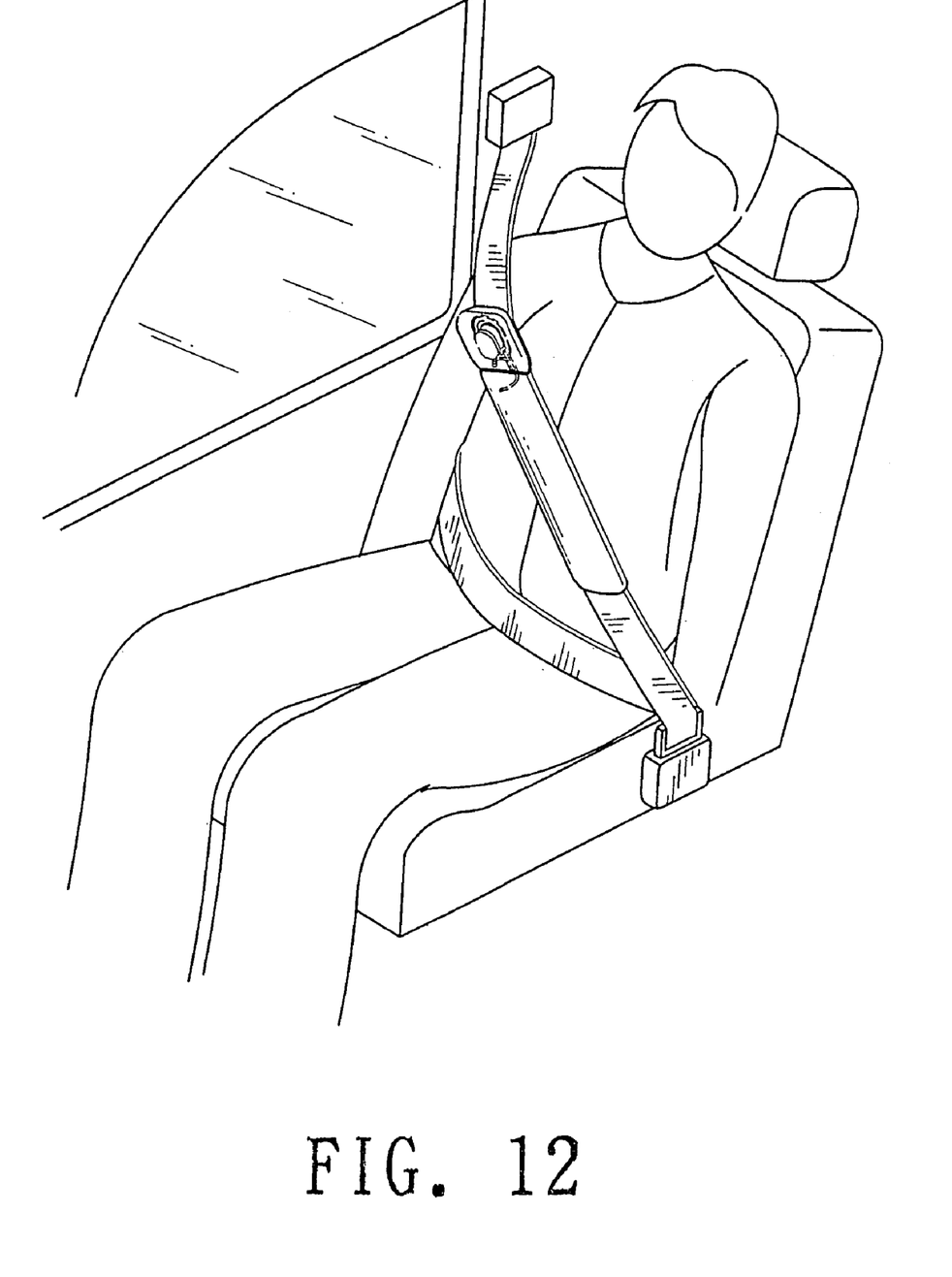
FIG. 12 shows one use of the present invention, where the present invention is applied to a safety belt.

Referring to FIGS. 9 to 11, the third embodiment of the present invention is illustrated. The main elements thereof identical to those described in the first embodiment will not be described herein. However in this embodiment, as shown in FIG. 10, the air cushion 2 is enclosed within the combining portion 1 so that the air cushion 2 is combined to the combining portion 1. Only the inflation unit 22 is exposed outside of the combining portion 1 so that the user can press it. A plurality of air holes 13 are formed on the combining portion 1. When the inflation unit 22 sucks air, air flows smoothly. In this embodiment, the air cushion 2 is enclosed in the combining portion 1, and thus it can be carried easily.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A belt pressure reduction device comprising:
   a combining portion being formed by folding two sides of a plane structure so that one side covers upon another side forming an adhering section that forms a hollow receiving space within the combining portion;
   an air cushion arranged within the hollow receiving space; the air cushion having two ends at two opposite sides of the air cushion; one end of the air cushion being an airbag and another end thereof being an air inflation unit; the airbag does not enclose the air inflation unit; wherein the inflation unit inflates air into the air cushion so as to cause the airbag to be elastic; and
   a belt arranged within the receiving space of the combining portion; the belt being arranged at one lateral side of the air cushion and thus adjacent to the air cushion;
   wherein n a plurality of ribs are transversally and parallel arranged upon on a surface of the airbag of the air cushion.

2. The belt pressure reduction device as claimed in claim 1, wherein the air cushion is not separated from the combining portion.

3. The belt pressure reduction device as claimed in claim 1, wherein the inflation unit of the air cushion is exposed outside of the combining portion.

4. The belt pressure reduction device as claimed in claim 1, wherein the combining portion is formed with at least one air hole.

5. The belt pressure reduction device as claimed in claim 1, wherein two ends of the combining portion are adapted to be repeatedly folded and unfolded.

* * * * *